Patented Mar. 4, 1924.

1,485,844

UNITED STATES PATENT OFFICE.

EDWIN BROUN FRED AND WILLIAM HAROLD PETERSON, OF MADISON, WISCONSIN.

FERMENTATION OF SOLUTIONS CONTAINING XYLOSE, ARABINOSE, AND OTHER PENTOSE SUGARS WITH THE PRODUCTION OF ACETIC ACID AND LACTIC AND OTHER ORGANIC ACIDS BY MICROORGANISMS.

No Drawing. Application filed August 7, 1919. Serial No. 315,952.

*To all whom it may concern:*

Be it known that we, EDWIN BROUN FRED and WILLIAM HAROLD PETERSON, citizens of the United States, residing at Madison, in the county of Dane, State of Wisconsin, have invented certain new and useful Improvements in the fermentation of solutions containing xylose, arabinose, and other pentose sugars with the production of acetic acid and lactic and other organic acids by microorganisms, of which the following is a specification.

Acetic acid and lactic acid as hitherto produced for industrial purposes have been obtained from the fermentation of glucose, lactose, or other sources and not by the fermentation of xylose or other pentoses. This process has for its purpose the production of acetic acid and lactic acid by the fermentation of either pure or crude pentose solutions and in this way furnishing a new and valuable source of these commercial products.

As starting material we use a solution of xylose or arabinose made from either the pure or crude sugars. This pure or crude pentose can be obtained from corn cobs, corn stover, cotton seed hulls, straw, or other equivalent plant materials by hydrolysis with dilute acids under suitable conditions of temperature and pressure, e. g., sulphuric acid of 2 per cent strength at a temperature of 15—20 pounds steam pressure for 1—2 hours. By filtering off the unhydrolyzed material a clear amber colored liquid is obtained which contains the pentose sugars and may be fermented by the addition of suitable nutrients and pentose fermenting microorganisms.

To bring about this fermentation the acid solution is neutralized with milk of lime or other weak alkali or potential alkali in suspension or solution and suitable nutrients such as yeast water, added. An excess of calcium carbonate or limestone is added and the liquid inoculated with cultures of certain microorganisms for example, *Lactobacillus pentoaceticus*, new species. In these media these microorganisms grow very rapidly and ferment the xylose, arabinose and other pentoses almost quantitatively to acetic acid and lactic acid. After a few days the fermentation is completed and the acetic acid and lactic acid may be obtained by several well known methods.

The details of the fermentation process described above may be considerably varied with respect to the concentration of the solution, duration of fermentation, and temperature employed.

In the following claims it is to be understood that wherever the terms "pentose" or "pentose sugar" are used, they are intended to cover xylose, arabinose or other pentoses which undergo fermentation into acetic and lactic acids by the means of fermenting microorganisms. Also, the expression "pentose yielding material" is intended to cover such substances as corn-cobs, corn-stover, straw, wood or other plants which by suitable hydrolysis will yield xylose, arabinose or other pentoses of a similar nature.

We claim:

1. A process comprising fermenting pentose with microorganisms of *Lactobacillus pentoaceticus*, new species.

2. A process comprising subjecting pentose sugar to the action of micro-organisms of *Lactobacillus pentoaceticus*, new species, and allowing fermentation to proceed until a high conversion of pentose sugar into acetic and lactic acids is obtained.

3. A process comprising fermenting hydrolyzed pentose yielding material with micro-organisms of *Lactobacillus pentoaceticus*, new species.

4. A process comprising subjecting hydrolyzed pentose yielding material to the action of micro-organisms of *Lactobacillus pentoaceticus*, new species, and allowing the fermentation to proceed until substantially all of the pentose is converted into lactic and acetic acids.

5. A process comprising subjecting pentose to the action of pentose-fermenting micro-organisms of the genus *Lactobacillus*.

6. A process comprising subjecting pentose sugar to the action of pentose-fermenting micro-organisms of the genus *Lactobacillus* and allowing fermentation to proceed until a high conversion of pentose sugar into acetic and lactic acids is obtained.

7. A process comprising fermenting hydrolyzed pentose yielding material with pentose-fermenting micro-organisms of the genus *Lactobacillus*.

8. A process comprising subjecting hydrolyzed pentose yielding material to the action of pentose-fermenting micro-organisms of the genus *Lactobacillus* and allowing the fermentation to proceed until substantially all of the pentose is converted into lactic and acetic acids.

EDWIN BROUN FRED.
WILLIAM HAROLD PETERSON.

Witnesses:
LULU OSBORN,
CLARA L. KELLOGG.